United States Patent
Majumdar et al.

(10) Patent No.: US 6,238,760 B1
(45) Date of Patent: May 29, 2001

(54) PULL TAB LABELS FOR MATCH MOUNTING A TIRE WITH A RIM

(75) Inventors: Ramendra Nath Majumdar, Hudson; Jeffery James Bollin, Toledo, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/256,561

(22) Filed: Feb. 24, 1999

(51) Int. Cl.[7] .................................................. B60C 13/00
(52) U.S. Cl. ..................... 428/40.1; 152/450; 152/524; 152/525; 428/41.3; 428/41.5; 428/41.8; 428/42.1; 428/913
(58) Field of Search ................... 428/40.1, 41.3, 428/41.5, 41.8, 42.1, 913; 152/524, 525, 450

(56) References Cited

U.S. PATENT DOCUMENTS

| | | | |
|---|---|---|---|
| 4,060,168 | 11/1977 | Romagnoli | 206/216 |
| 4,584,219 | 4/1986 | Baartmans | 428/42 |
| 5,472,756 | * 12/1995 | Sechet | 428/40.1 |
| 5,840,138 | * 11/1998 | Majumdar | 152/524 |

OTHER PUBLICATIONS

An article entitled "Mechanics of Pneumatic Tires", Editor, Samuel K. Clark, University of Michigan, Ann Arbor, Michigan 48109, U.S. Department of Transportation National Highway Traffic Safety Administration, Washington, DC 20590, p. 633, Aug., 1981.

An article entitled "Corresponding Vehicle Shake", by A. H. Neill, Jr., and Akira Konda, *Tire Science and Technology*, TSTCA, vol. 2, No. 3, Aug., 1974, pp. 179 through 194.

* cited by examiner

Primary Examiner—Nasser Ahmad
(74) Attorney, Agent, or Firm—Henry C. Young, Jr.

(57) ABSTRACT

Pressure sensitive labels, which desirably are coated with fluorescent ink having a non-stick pull tab end portion are utilized to indicate a substantially maximum or minimum radial distance of a tire tread and to indicate, respectively, a substantial minimum or maximum radial distance of a matingly engagable tire rim. The tire is applied to the rim with the labels in substantial radial alignment so as to reduce the out of round portion of the tire tread.

12 Claims, 1 Drawing Sheet

PULL TAB LABELS FOR MATCH MOUNTING A TIRE WITH A RIM

FIELD OF THE INVENTION

The present invention relates to a pressure sensitive adhesive label having a non-stick pull tab portion to align a generally radially substantially maximum tread distance with a radially substantially minimum rim distance to abate tire tread variation or out of round of the tire tread.

BACKGROUND OF THE INVENTION

In the manufacture of tires, various inherent variations occur, such as weight differences in different segments of the tire, width differences in different segments of the tire, or radial differences in different segments of the tire such that the tread in one area can be off-set from the average radius; that is, the tire tread is "out of round."

In the manufacture of vehicle rims, similar inherent deformities also occur, including different radial distances.

Heretofore, a tire has been applied randomly to a rim so that if a maximum radial tread distance existed, it generally still existed in the assembled tire or was compounded if the same was aligned with a maximum radial distance of the rim. Such deformities could result in excess tread wear in the particular out of round tread area and if the deformity was great enough, tire thumping could even occur.

Heretofore, labels have been utilized to radially align a specific portion of a tire tread such as a maximum radial tread distance with a minimum radial distance of a rim. Such labels have been generally entirely coated with an adhesive on one side thereof which made removal thereof from a tire difficult. Alternatively, an end portion of the totally coated label contained an end portion having an additional or deadening material thereon to neutralize the adhesive, thus forming a pull tab area. Such labels were still often difficult to grasp and cumbersome to manufacture.

Another pressure sensitive adhesive label having tire size information thereon has a release liner with a plurality of transverse cuts across the width at a center portion so that upon application to the tread of a tire, the center portion containing a uniform product code has a backing (i.e., a release liner) which can be read. These labels are not used for radially match mounting a tire and rim.

SUMMARY OF THE INVENTION

It is therefore an object of the present invention to reduce tire tread variation and especially the maximum tread distance from the average radial tread distance by match mounting a portion of the tire having a substantially maximum tread radius with a portion of the rim having a substantially minimum rim radius.

In pull tab labels for radially match mounting a tire with a rim wherein one pull tab label is attached to a tire in the vicinity of a maximum or minimum radial tread distance and another pull tab label is attached to a matingly engagable rim in the vicinity, respectively, of a minimum or a maximum rim radial distance so that the rim can be inserted into the tire with the rim pull tab label located substantially in radial alignment with said tire pull tab label to minimize the maximum radial tread offset of the tire, the improvement comprising at least one of said pull tab labels having a pressure sensitive adhesive coating substantially one side of a substrate with an end portion of said adhesively coated side being substantially free of said pressure sensitive adhesive so that upon alignment of said tire label with said rim label, said tire label and said rim label can be removed through said non-coated end portion.

DETAILED DESCRIPTION

Figure 1:
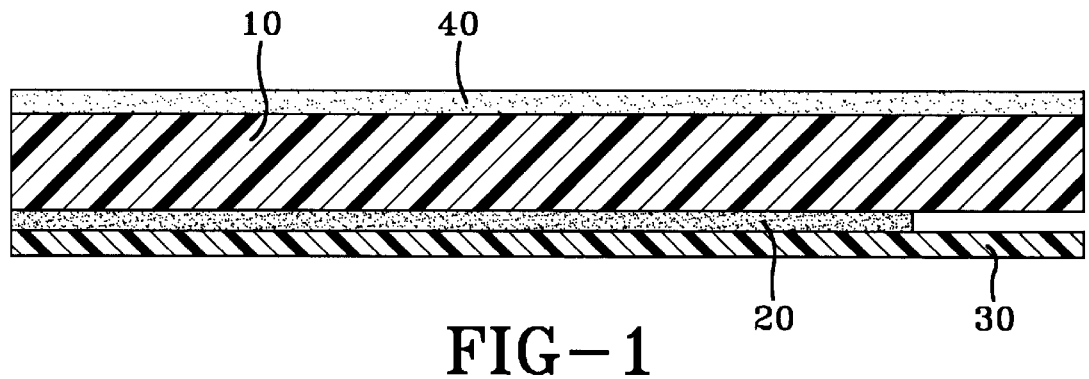
FIG. 1 is a cross-sectional view of a pull tab label according to the present invention.

Vehicle tires such as pneumatic or solid often have deformities, for example, they are out of round. In other words, the radius of the tread of a particular tire is not constant, but varies and has a high point, i.e., a maximum radial distance or radius which is furthest away from the center of the tire. For purposes of the present invention, it is to be understood that while a tire generally has a single maximum radial distance, it at times can have a plurality of such distances. It is desirable to reduce or abate such radial distances, or at least the maximum radial distance or high point in order to reduce wear at such a location as well as to reduce a road shake, roughness, etc., of a vehicle caused by such out of round tires.

Rims utilized for vehicle tires, while also having a nominal radius or radial distance at the edge thereof, also have a high point or maximum radius or a plurality of high points and also have a low point or minimum radius or a plurality of low points.

In the assembly of a tire onto a rim, it is desirable to align a maximum or substantially maximum tire radial distance (high point) with a minimum or substantially minimum rim radial distance (low point) in order that the tire tread out of round is reduced. While this is a preferred form of the present invention, it alternatively relates to aligning a minimum or substantially minimum tire radial distance with a maximum or substantially maximum rim radial distance in order to reduce or abate a negative or a minimum tread radius.

The substantially maximum or maximum tire tread radius can be located by a number of methods know to the art or to the literature, such as by utilizing a first harmonic method. In this method, a radial force of a tire in waveform is first determined followed by the determination of the first harmonic. The positive peak or the substantially maximum radial distance of the first harmonic is marked and a pull tab label of the present invention is placed radially along (i.e., on top of) the marking. Alternatively, the label is applied adjacent to the mark so that the marking is visible. Such a substantially maximum radial distance or maximum radial distance can be determined by various Force Variation Test Machines which are available from Akron Standard Corporation, of Akron, Ohio, Logan Machine Company of Akron, Ohio, and Akron Specialty Machinery, Inc. of Akron, Ohio. A negative peak or substantially minimum radial distance of the rim is determined by run out measurement (i.e., how round the rim is) and marked, and a similar pull tab label is placed radially along the marked minimum or substantially minimum distance.

The label, which can be of any size or shape, is preferably longitudinal such as rectangular, rectangular with rounded edges, or oval. The labels generally have an adhesive on one side thereof and a non-stick end portion commonly referred to as a pull tab. The label substrate can be made out of any common material such as cloth, paper, but preferably is made of plastic such as plasticized poly (vinyl chloride), polyethylene, poly (vinyl chloride) coated cloth, and the like, with polyester being preferred. The plastic label is generally flexible at cold temperatures. While various adhesives can be utilized, pressure sensitive adhesives are preferred. Generally, any conventional pressure sensitive adhesive can be utilized and the same is known to the art and to the literature. Conventional pressure-sensitive adhesives based on natural rubber, styrene-butadiene rubber, styrene-isoprene-styrene tri-block copolymers, polyacrylates, and the like, can be utilized. Tackifiers are generally added to the above noted polymers to generate pressure sensitive tack. A preferred pressure sensitive adhesive is a styrenediene-styrene tri-block copolymer tackified with a hydrocarbon resin as described in U.S. Pat. No. 5,204,390, which is hereby fully incorporated by reference. Such adhesives can be coated on the polymer by hot melt technology. The pressure sensitive adhesive is generally made in the form of a tape, that is, as a roll, and has a release liner as a backing which is, of course, releasably secured to the pressure sensitive adhesive.

The pull tab portion of the labels of the present invention are formed by having an end portion of the label being non-stick. Such labels can be made in a number of ways. One method is to apply a pressure sensitive adhesive to less than the total label, such as to a substantial or major portion thereof, so that an adhesive free end exists. For example, the pressure sensitive adhesive can cover approximately 50 to about 90 or 95, desirably from about 60 to about 85, and preferably from about 70 to about 80 percent of the total area or length of the label. The remaining end portion is thus free of or contains no such adhesive. Accordingly, the area of the label free of the pressure sensitive adhesive is from about 5 or 10 to about 50, desirably from about 15 to about 40, and preferably from about 20 to about 30 percent. The label area free of an adhesive, of course, will not adhere or stick to the release liner or to a tire sidewall when applied thereto and thus form a pull tab end portion. Such a label is shown in FIG. 1 wherein the numeral 10 indicates the face sheet or substrate, such as a polyester sheet, the numeral 20 indicates the adhesive such as a pressure sensitive adhesive which adhered to the backing, and the numeral 30 indicates the release liner which can extend to the end of the label as indicated, or a shorter distance, but covers (i.e. releasably adheres) the pressure sensitive adhesive. The label on the remaining (non-pressure sensitive adhesive coated side), optionally, but mandatory for use with an automatic match mounting machine, is coated with at least one fluorescent pigment or dye 40. Alternatively the label is coated with a composition containing at least one fluorescent pigment or dye and polyvinyl alcohol. Such fluorescent pigments or dyes are known to the art and to literature and include conventional fluorescent dyes such as TRY 33, available from Day-Glo Color Corp., Cleveland, Ohio as well as fluorescent inks, available from Gotham Ink and Color Co., Inc., Stony Point, N.Y. In order that the fluorescent dye or pigment adheres to the substrates, such as plasticized polyvinylchloride or polyester, the dye or pigment is generally contained in an organic solvent as opposed to a water-based system.

A similar pull tab label having similar components as described above is shown in FIG. 2, wherein the face sheet or substrate 50 is coated on one side with an optional fluorescent dye or pigment 80. etc., and on the other or remaining side contains a pressure sensitive adhesive 60 generally along the entire length thereof. Release liner 70 is attached or adhered to and generally extends along the entire length of the substrate. The release liner contains a transverse cut a desirable distance from one end thereof as set forth in the above ranges with regard to the adhesive free portion. Upon application to a tire or rim, the large portion of the release liner is removed and due to the existence of cut 72, the remaining portion of the release liner will adhere to the adhesive and form a non-stick portion or area. Thus, upon application to the tire, the end portion containing the release liner will form a non-stick pull tab. This pull tab label when utilized with an automatic match-mounting machine contains a fluorescent coating as noted above.

The pull tab labels of the present invention are utilized as follows: The substantially maximum or maximum radial distance (e.g., largest radius) of a vehicle tire from the center thereof is determined in a manner as noted above, as for example, through the use of a force variation test machine utilizing a first harmonic method. The machine generally indicates the maximum radial distance by applying a dot mark thereto. A pull tab label as described herein above is then manually applied to the tire sidewall parallel to (e.g., on top of) the maximum radial distance, i.e., a line extending from the center of the tire to the largest or substantially largest tire tread distance therefrom. Desirably, the label is applied to the edge of the tire so that it substantially extends from the tire sidewall in the vicinity of the tire tread towards the center portion of the tire sidewall. In a manner as described herein above, the minimum or substantially minimum radial distance of a tire rim is located or determined by a machine and a dot mark is placed thereon. A pull tab label is then applied thereto. That is, the label, such as a round edge rectangular label, extends parallel and adjacent to the minimum radial distance.

It is noted that the location and determination of the substantially maximum radial distance of the tire and the application of a label marking, indicating or noting such a radius is generally done by a tire manufacturer after the production of a cured tire. Similarly, the marking of the substantially minimum radial distance of a rim is conducted by the rim maker after the production thereof. At some later point in time, a tire and rim so marked are brought together for assembly. The tire and rim are then automatically match mounted as by the utilization of match mounting equipment which is available from Dominion Tool and Die Company of Michigan, which utilizes a Lut 1–4 Luminescence Scanner to locate and align the fluorescent label. During insertion of the tire to the rim, the two labels are substantially radially aligned. When so aligned, the two labels substantially form a straight line. After mounting the tire to the rim, the individual labels can be removed by grasping the above-described pull tab portions. The net result is a tire wherein a radial offset (e.g., high point) is reduced, abated, or eliminated since the radial outward projection thereof has been matched mounted with the radially inward recess (e.g., low point) of a rim.

The invention will be better understood by reference to the following examples, which serve to illustrate, but not limit, the present invention.

EXAMPLES

Figure 2:
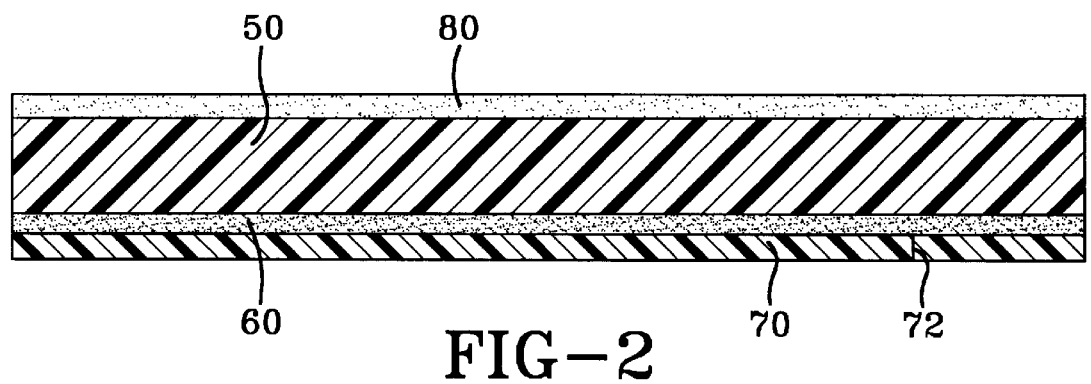
FIG. 2 is a cross-sectional view of an alternative embodiment of a pull tab label of the present invention.

The substrate or face sheet of pressure sensitive adhesive labels as set forth in either FIG. 1 or FIG. 2 where coated with a fluorescent ink contained in organic solution, such as TRY 33, available from Day-Glo Color Corporation of Cleveland, Ohio. The substrate or face sheet was an opaque white 1 mil thick 329 polyester from Micron Coatings, Inc., of Connecticut. The adhesive thereon was a pressure sensitive hot melt, i.e., Nicolmelt 82199 from Swift Adhesives, a Division of Reichhold Chemicals, Inc., North Carolina. The labels were manually applied to radially extending dot marks applied by a force variation test machine. Similarly, labels were applied to dot marks on a rim. Subsequently, a match-mounting machine made by Dominion Tool and Die Company was utilized to automatically align the fluorescent label on the tire indicating the maximum radial distance with a fluorescent label on the rim indicating the minimum radial distance. Tires & rims so match mounted required much less balancing weight as compared to non-matched tire and rims when balanced with a dynamic balancing machine.

While in accordance with the Patent Statutes, the best mode and preferred embodiment have been set forth, the scope of the invention is not limited thereto, but rather by the scope of the attached claims.

What is claimed is:

1. In pull tab labels for radially match mounting a tire with a rim wherein one pull tab label is attached to a tire in the vicinity of a maximum or minimum radial tread distance and another pull tab label is attached to a matingly engagable rim in the vicinity, respectively, of a minimum or a maximum rim radial distance so that the rim can be inserted into the tire with the rim pull tab label located substantially in radial alignment with said tire pull tab label to minimize the maximum radial tread offset of the tire;

the improvement comprising at least one of said pull tab labels having a pressure sensitive adhesive coating substantially one side of a substrate with an end portion of said adhesively coated side being substantially free of said pressure sensitive adhesive so that upon alignment of said tire label with said rim label, said entire tire label and said entire rim label can be removed through said non-coated end portion.

2. In pull tab labels according to claim 1, wherein a fluorescent material is coated on said non-adhesive side.

3. In pull tab labels according to claim 1, wherein said adhesive coated side contains adhesive from about 50% to about 90% along the length thereof.

4. In pull tab labels according to claim 2, wherein said adhesive coated side contains adhesive from about 70% to about 80% along the length thereof.

5. In pull tab labels according to claim 2, wherein said adhesive coated side contains adhesive from about 60% to about 85% along the length thereof, wherein said substrate is plasticized poly(vinyl chloride), polyethylene, poly(vinyl chloride) coated cloth, or polyester.

6. In pull tab labels according to claim 1, wherein a release liner is attached to said pressure sensitive adhesive before attachment of said label to said tire or said rim.

7. In pull tab labels according to claim 4, wherein a release liner is attached to said pressure sensitive adhesive before attachment of said label to said tire or said rim.

8. In pull tab labels according to claim 5, wherein a release liner is attached to said pressure sensitive adhesive before attachment of said label to said tire or said rim.

9. In pull tab labels for radially match mounting a tire with a rim wherein one pull tab label is attached to a tire in the vicinity of a maximum or minimum radial tread distance and another pull tab label is attached to a matingly engagable rim in the vicinity, respectively, of a minimum or a maximum rim radial distance so that the rim can be inserted into the tire with the rim pull tab label located substantially in radial alignment with said tire pull tab label to minimize the maximum radial tread offset of the tire;

the improvement comprising said pull tab labels having a pressure sensitive adhesive substantially coating one side thereof, and a release liner being adhered to said pressure sensitive adhesive, said release liner having a transverse cut at a distance from one end dividing said release liner into (1) a larger portion which is removed from said pull tab label before application, and (2) an end portion which covers said pressure sensitive adhesive and forms a non-stick pull tab so that upon alignment of said tire label with said rim label, said entire tire label and said entire rim label can be removed through said adhered release liner end portion.

10. In pull tab labels according to claim 9, wherein the length of said release liner end portion is from about 5% to about 50% of the total length of the said label.

11. In pull tab labels according to claim 10, wherein the length of said release liner end portion is from about 60% to about 85% of the total length of the said label, and wherein the remaining side of said label is coated with a fluorescent material.

12. In pull tab labels according to claim 11, wherein said substrate is plasticized poly(vinyl chloride), polyethylene, poly(vinyl chloride) coated cloth, or polyester.

* * * * *